US012597571B2

(12) United States Patent
Sakai

(10) Patent No.: US 12,597,571 B2
(45) Date of Patent: Apr. 7, 2026

(54) BUTTON APPARATUS AND ELECTRONIC EQUIPMENT

(71) Applicant: CASIO COMPUTER CO., LTD., Tokyo (JP)

(72) Inventor: Otoya Sakai, Machida (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 149 days.

(21) Appl. No.: 18/327,485

(22) Filed: Jun. 1, 2023

(65) Prior Publication Data

US 2023/0395338 A1 Dec. 7, 2023

(30) Foreign Application Priority Data

Jun. 1, 2022 (JP) ................................ 2022-089480

(51) Int. Cl.
*H01H 13/14* (2006.01)
*G10H 1/34* (2006.01)
*H01H 13/02* (2006.01)

(52) U.S. Cl.
CPC .............. *H01H 13/14* (2013.01); *G10H 1/34* (2013.01); *H01H 13/023* (2013.01)

(58) Field of Classification Search
CPC ...... H01H 13/14; H01H 13/023; H01H 13/02; H01H 3/12; G10H 1/34; G10H 2220/275; G10H 1/344
See application file for complete search history.

(56) References Cited

U.S. PATENT DOCUMENTS 5,794,762 A * 8/1998 Tsai ..................... H01H 13/705 200/345
6,743,993 B1 * 6/2004 Clark ................... H01H 13/702 200/314
2015/0170850 A1 * 6/2015 Kirita ..................... H01H 13/83 200/314

FOREIGN PATENT DOCUMENTS

| | | | |
|---|---|---|---|
| JP | 2006093062 | A | 4/2006 |
| JP | 2012128123 | A | 7/2012 |
| JP | 2014203677 | A | 10/2014 |
| JP | 2020-155317 | A | 9/2020 |

OTHER PUBLICATIONS

Notice of Reason for Refusal dated May 7, 2024 received in Japanese Patent Application No. JP 2022-089480.

* cited by examiner

*Primary Examiner* — Lheiren Mae A Caroc
(74) *Attorney, Agent, or Firm* — Scully, Scott, Murphy & Presser, P.C.

(57) ABSTRACT

A button apparatus includes a push member on which a push operation can be performed, an elastic member of a substantially hollowed shape provided on a push direction side of the push member and configured to be elastically deformed on a side thereof which faces the push member in response to the push operation performed on the push member, a detector configured to detect the push operation performed on the push member, and a moving member supported on the elastic member and configured to move in the push direction in response to the push operation performed on the push member, and a side of the elastic member which faces the detector is elastically deformed as a result of the moving member moving in response to the push operation.

14 Claims, 12 Drawing Sheets

E2
56b
56d
56a 62
54d
56e
W1
W2
T2
T1
E1
Z
X
Y
50
26
26a
52a1
56e
54d
52
52b
E2
58
54
56
54c
(54b)
60a
60
54b1
E1
62
54b1
27
54c
(54b)

BUTTON APPARATUS AND ELECTRONIC EQUIPMENT

CROSS-REFERENCE TO RELATED APPLICATION

This patent application is based upon and claims the benefit of priority under 35 USC 119 of Japanese Patent Application No. 2022-089480 filed on Jun. 1, 2022, the entire disclosure of which, including the specification, claims, drawings and abstract, is incorporated herein by reference in its entirety.

BACKGROUND

Technical Field

The present disclosure relates to a button apparatus and electronic equipment.

Description of the Related Art

There have conventionally been known button apparatuses equipped on electronic equipment such as an electronic piano or the like for enabling various settings. In button apparatuses of this type, there have been proposed some button apparatuses which include an elastic member such as a rubber member so as to improve a clicking feel sensed by a user when he or she pushes down the button apparatus. For example, Japanese Unexamined Patent Application Publication No. 2020-155317 (JP-A-2020-155317) discloses a push-button switch including a front case, a movable contact sheet, a push button, a key guide, and a click rubber which is an elastic member.

In this push-button switch, the click rubber is provided at a lower portion of the push button, and when the push button is pushed down by a user, a part of the push button pushes the click rubber downwards while being guided by the key guide, and eventually, the click rubber pushes the movable contact sheet downwards.

SUMMARY

According to an aspect of the present disclosure, there is provided a button apparatus comprising a push member on which a push operation can be performed, an elastic member of a substantially hollowed shape provided on a push direction side of the push member and configured to be elastically deformed on a side thereof which faces the push member in response to the push operation performed on the push member, a detector configured to detect the push operation performed on the push member, and a moving member supported on the elastic member and configured to move in the push direction in response to the push operation performed on the push member, and a side of the elastic member which faces the detector is elastically deformed as a result of the moving member moving in response to the push operation.

According to another aspect of the present disclosure, there is provided electronic equipment including the button apparatus.

DESCRIPTION OF THE EMBODIMENT

Figure 1:
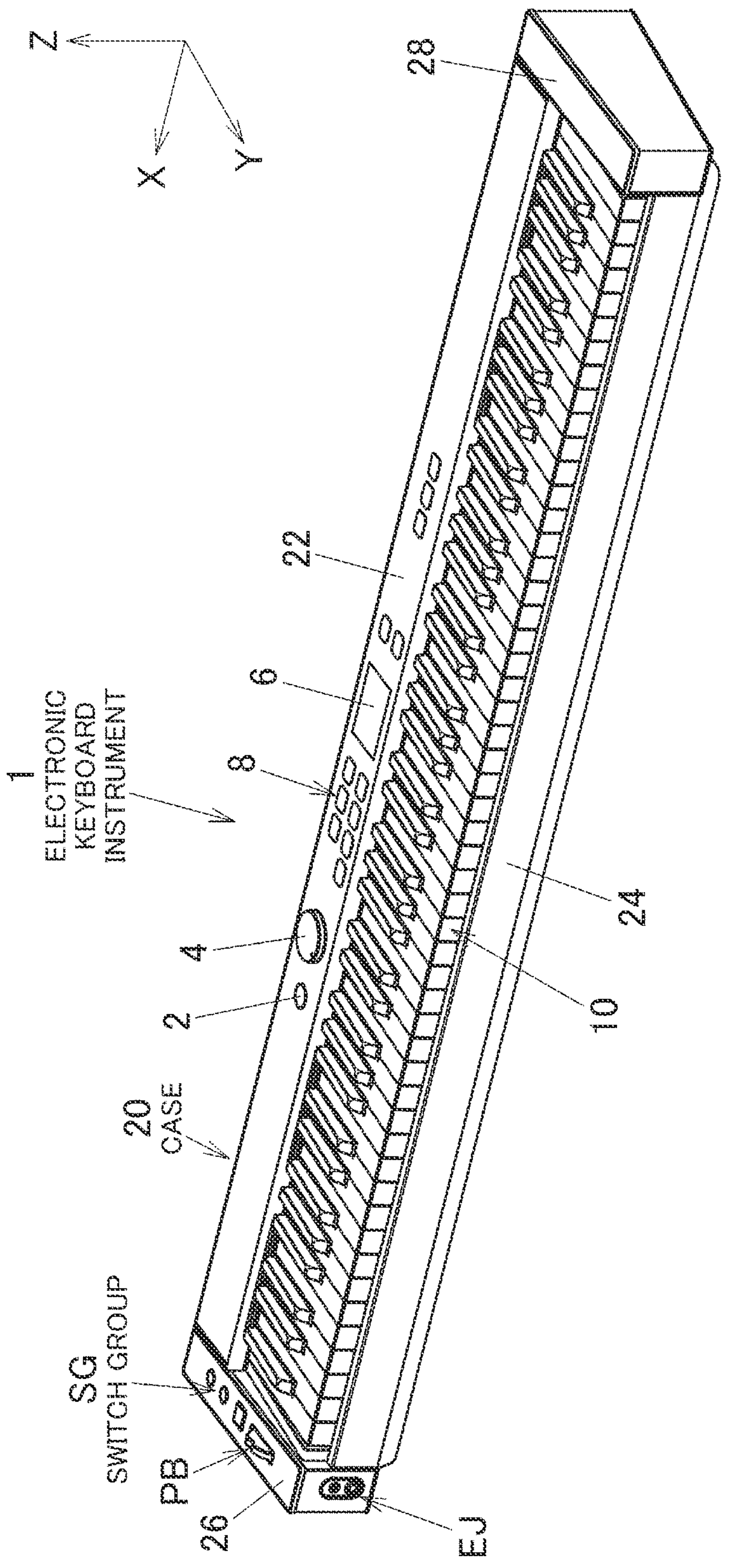
FIG. 1 is an overall perspective view of a keyboard instrument according to an embodiment of the present disclosure.

Referring to drawings, an embodiment of the present disclosure will be described below. An electronic keyboard instrument (electronic equipment) 1 shown in FIG. 1 includes a keyboard unit 10 including plural white keys and plural black keys, and a case 20. A control circuit board, not shown, and the like are accommodated in an interior of the case 20. Coordinate axes are shown in each accompanying drawing. Hereinafter, the embodiment will be described based on the understanding that in each accompanying drawing, an X-axis direction is referred to as a left-right direction of the electronic keyboard instrument 1 (a key alignment direction in the keyboard unit 10) (an X-axis positive direction is referred to as a left direction), a Y-axis direction is referred to as a front-rear direction of the electronic keyboard instrument 1 (a direction in which each key extends in the keyboard unit 10) (a Y-axis positive direction is referred to as a front direction), and a Z-axis direction is referred to as an up-down direction of the electronic keyboard instrument 1 (a Z-axis positive direction is referred to as an up direction).

Figure 2:
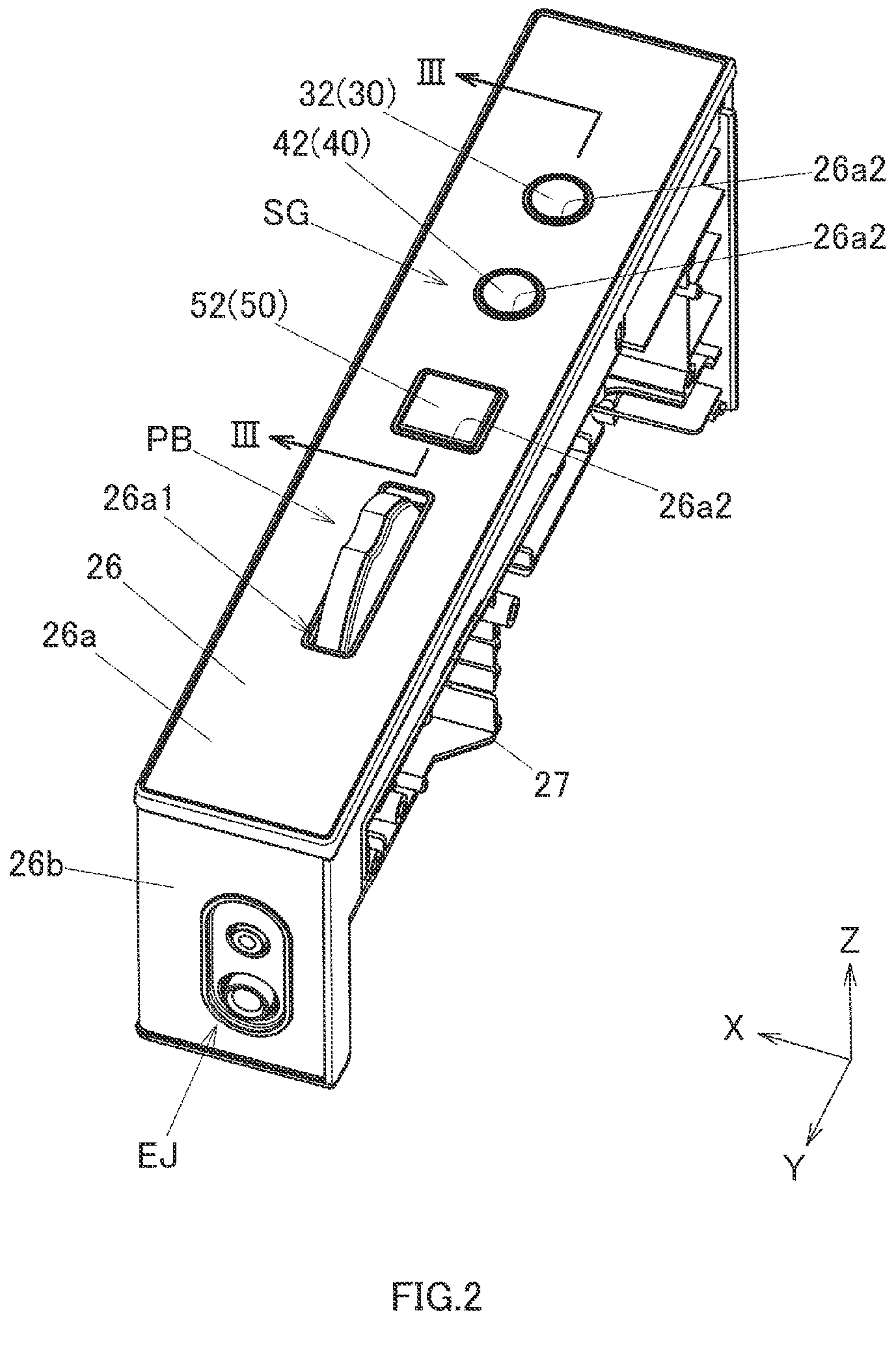
FIG. 2 is a perspective view of a left case of the electronic keyboard instrument according to the embodiment as viewed from a right side.

The case 20 has substantially a horizontally long rectangular plate shape in which a longitudinal direction follows the left-right direction and is made from a synthetic resin. The case 20 is divided into an upper case 22, a lower case 24, a left case 26, and a right case 28. A power supply button 2 for switching on and off a power supply to the electronic keyboard instrument 1, a volume knob 4 for controlling the volume of sound produced in the electronic keyboard instrument 1, a liquid crystal display portion 6, and a control panel portion 8 are provided on an upper surface of the upper case 22. As shown in FIG. 2, the left case 26 has an upper panel 26*a* which makes up an upper surface thereof and which is formed from an acrylic resin and a case side wall 26*b* which makes up a side wall of the left case 26. A control opening portion 26*a*1 is provided in a front portion the upper panel 26*a* so that a part of a pitch bender PB, which is configured to control the pitch of a note by bending or changing smoothly the pitch of the note, is exposed therefrom. Setting opening portions 26*a*2 are provided in a rear portion of the upper panel 26*a* so that parts (upper surfaces of key tops 32, 42, 52, which will be described later) of a button group SG, which is configured to make various settings, are exposed therefrom. In addition, an earphone jack EJ is provided in a front surface of the case side wall 26*b*.

The button groove SG has three buttons (button apparatuses) 30, 40, 50, which are disposed at substantially equal intervals in the front-rear direction and are configured to be pushed down in a Z-axis negative direction (a push direction). These three buttons 30, 40, 50 are referred to sequentially as a first setting button 30, a second setting button 40, and a decision button 50 as viewed from a rear side of the upper panel 26*a*. The first setting button 30 is a button for switching on and off, for example, a function of automatically play a broken chord in the electronic keyboard instrument 1. The second setting button 40 is a button for providing, for example, a function of a smartphone application. The decision button 50 is a button to which, for example, a modulation effect and other functions of the electronic keyboard instrument 1 are assigned. Various functions other than those described above can also be assigned to the individual buttons 30, 40, 50. In other words, the electronic keyboard instrument 1 (the electronic equipment) excluding the button apparatuses 30, 40, 50 constitutes an electronic equipment main body which is operated by the button apparatuses 30, 40, 50.

Figure 3:
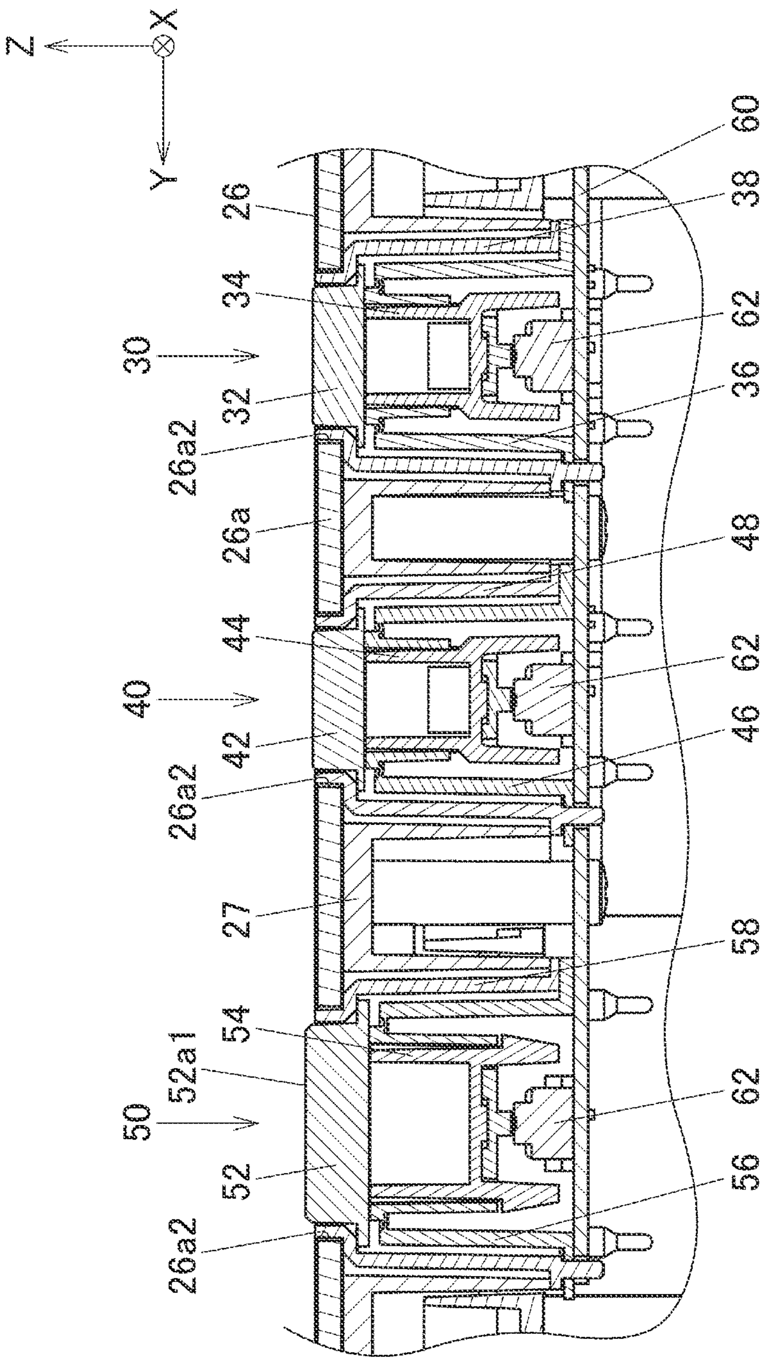
FIG. 3 is a sectional view in a front-rear direction of a button group of the electronic keyboard instrument according to the embodiment, taken along a line in FIG. 2.
Figure 4:
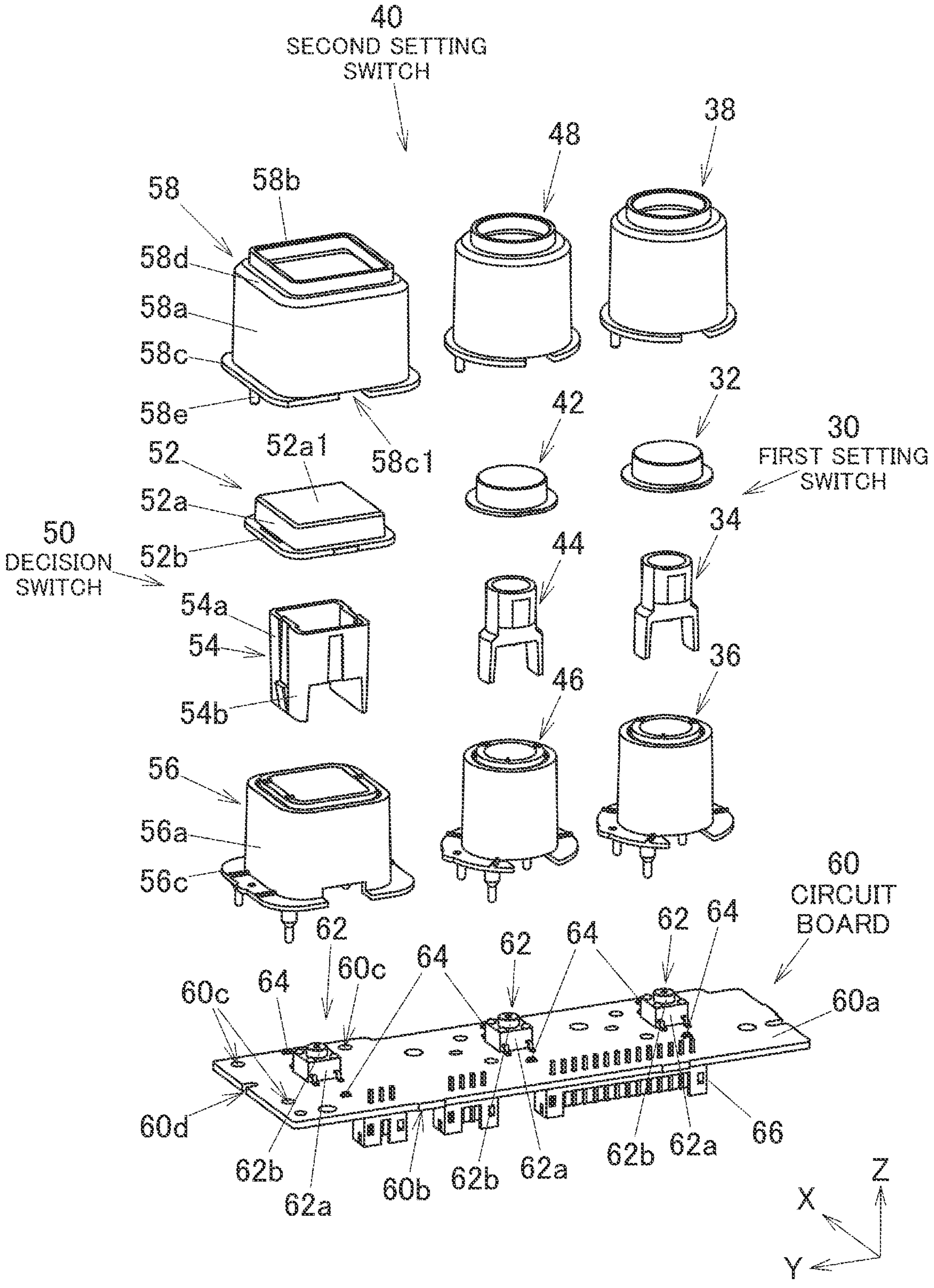
FIG. 4 is an exploded perspective view of the button group of the electronic keyboard instrument according to the embodiment.

An inner frame 27, which is a member of a frame shape, is provided on an inner surface side of the left case 26. Individual members making up the pitch bender PB, individual members making up the button group SG, and the like are accommodated inside the inner frame 27. As shown in FIGS. 3 and 4, a circuit board 60 is provided inside the inner frame 27 in a position lying underneath the button group SG. Button units (detectors) 62 and pairs of light emitting diodes (LEDs) (light sources) 64 are provided individually in positions corresponding to the buttons 30, 40, 50 in the up-down direction on an upper surface 60*a* of the circuit board 60. The button units 62 are configured to be pushed down to switch on and off the individual functions of the buttons 30, 40, 50. Each of the pairs of LEDs 64 is provided for each button unit 62 with a light emitting side oriented upwards. That is, one button unit 62 and a pair of LEDs 64 are provided individually at a rear side or portion, a substantially central portion in the front-rear direction, and a front side or portion of the circuit board 60. Contact terminals 66, which are electrically connected with individual equipment inside the case 20, are provided on a lower surface 60*b* of the circuit board 60.

The button units 62 provided on the upper surface 60*a* of the circuit board 60 each have a fixed contact module 62*a* of a substantially rectangular parallelepiped shape and a moving contact module 60*b* of a substantially circular cylindrical shape. The fixed contact module 62*a* is fixed to the circuit board 60 and is electrically connected with connection wiring on the circuit board 60. The moving contact module 60*b* is provided on the fixed contact module 62*a* and is configured to move relatively to the fixed contact module 62*a* in the up-down direction. When the moving contact modules 62*b* are pushed down to move downwards by the corresponding buttons 30, 40, 50, contact terminals inside the moving contact modules 62*b* are brought into abutment with contact terminals inside the fixed contact modules 62*a* so as to switch on and off the individual functions of the buttons 30, 40, 50.

The first setting button 30, the second setting button and the decision button 50, which make up the button group SG, have the same mechanical configuration and are different only in external shape from one another. Specifically speaking, the first setting button 30 and the second setting button 40 each have a substantially circular cylindrical external shape as a whole, and portions thereof which are configured to be pushed down by a user each have a circular shape. The decision button 50 has a substantially angular cylindrical external shape, and a portion thereof which is configured to be pushed down by the user has a substantially square shape (refer to FIG. 4 and the like). The individual buttons 30, 40, 50 include, respectively, key tops (push members) 32, 42, 52 each having a surface configured to be pushed down by the user, key guides (moving members) 34, 44, 54 which are provided underneath the corresponding key tops 32, 52, 52, rubber keys 36, 46, 56 which are rubber members, and light guides (light guiding members) 38, 48, 58 for guiding light from the LEDs 64 towards the key tops 32, 42, 52.

Figure 7:
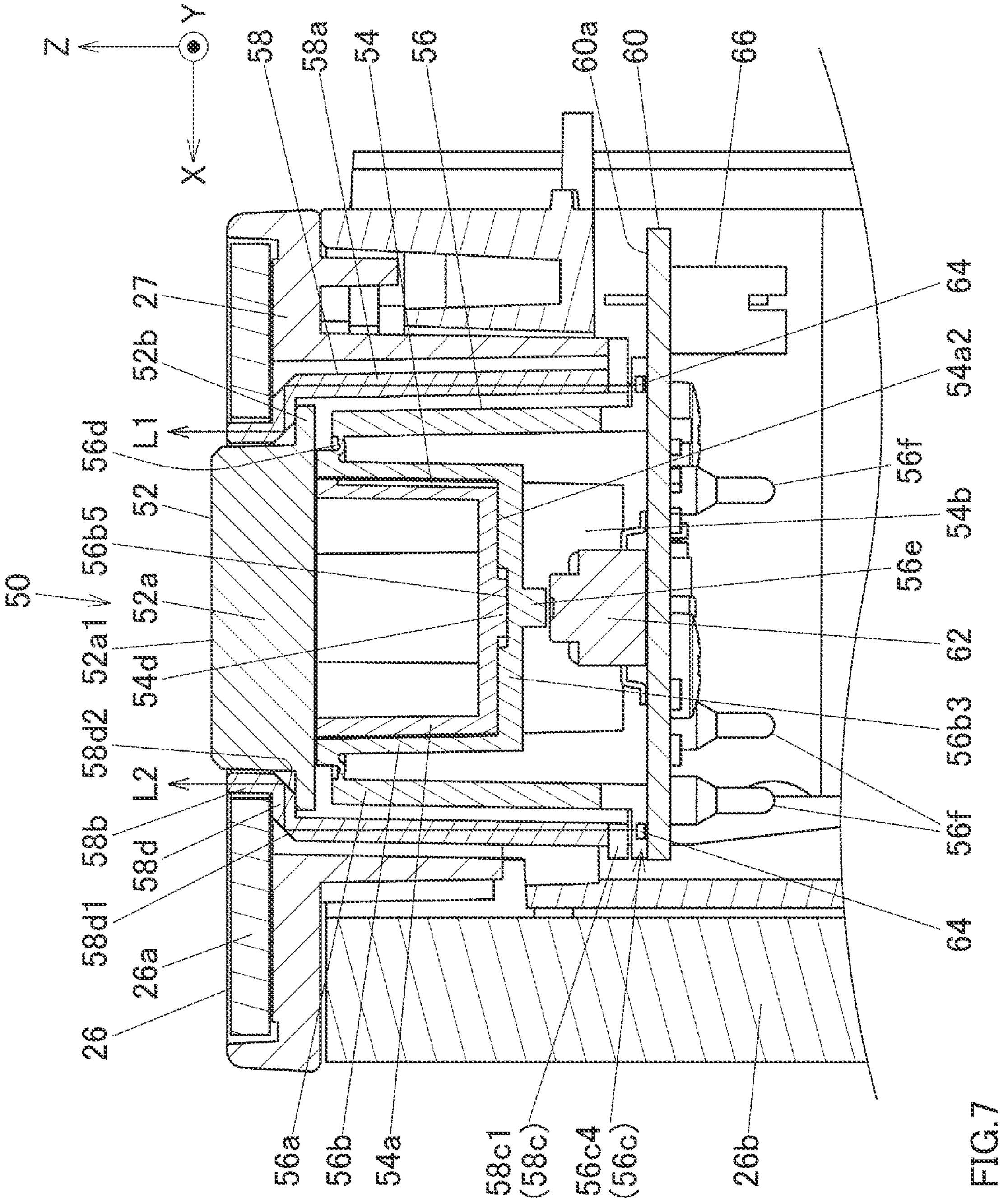
FIG. 7 is a sectional view in a left-right direction of the decision key according to the embodiment.

Hereinafter, in the buttons 30, 40, 50 making up the button group SG and having the same mechanical configuration, the configuration (excluding the circuit board 60 and the LEDs 64) of the decision button 50 will be described in detail. As shown in FIGS. 4, 7, and the like, the key top 52 of the decision button 50 is a thick member of a substantially square plate shape and is formed from, for example, a transparent acrylic resin. The key top 52 has a square plate portion 52*a* of a substantially square plate shape and a first protruding portion (a protruding portion) 52*b* which protrudes outwards from an edge portion of a lower surface of the square plate portion 52*a* as in the form of a collar. An upper surface (hereinafter, referred to as a "push surface 52*a*1") of the square plate portion 52*a* is formed into a substantially square flat surface. The first protruding portion 52*b* protrudes outwards of the push surface 52*a*1.

The push surface 52*a*1 is exposed from the setting opening portion 26*a*2 in the left case 26 and then constitutes a surface on which the user performs a push operation. When the push surface 52*a*1 is in such a state that no push operation is performed thereon (hereinafter, referred to as a "normal state"), the push surface 52*a*1 is positioned slightly upwards (for example, 0.2 mm upwards) of the upper panel 26*a* of the left case 26. As shown in FIG. 3, the square plate portion 52*a* is formed thicker than the upper panel 26*a*, and the first protruding portion 52*b* is positioned underneath the upper panel 26*a*. For example, a black printing is applied to a lower surface of the key top 52, whereby a construction below the key top 52 is prevented from being seen through the push surface 52*a*1.

Figure 5A:
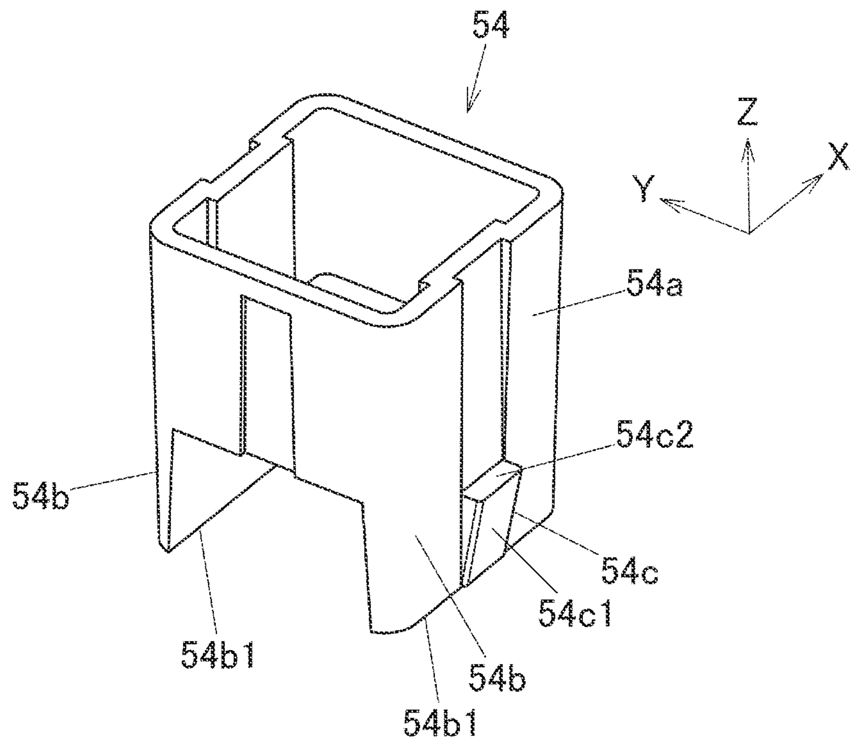
FIG. 5A is a perspective view of a key guide of a decision button according to the embodiment, resulting when the key guide is seen obliquely from above.
Figure 5B:
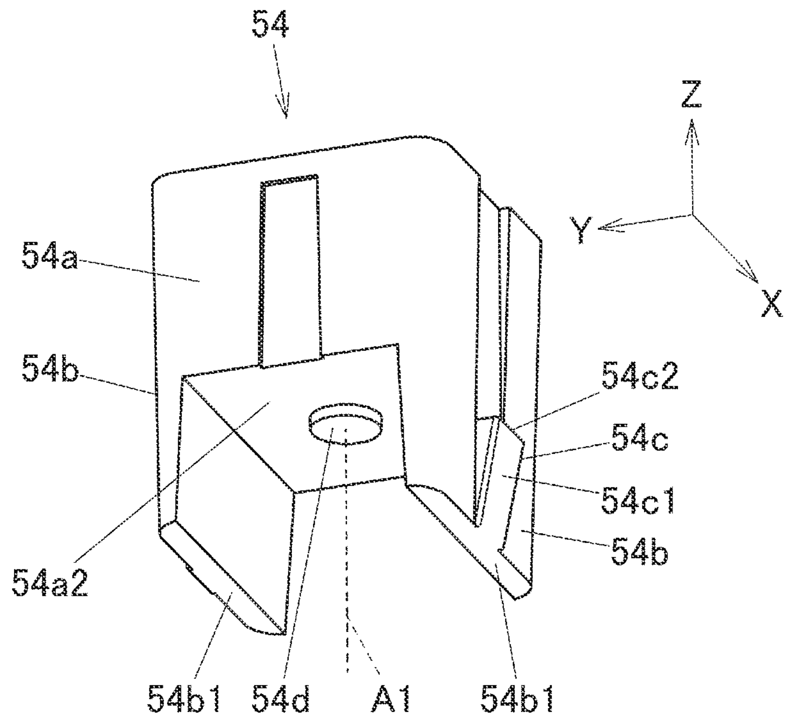
FIG. 5B is a perspective view of the key guide of the decision button according to the embodiment, resulting when the key guide is seen obliquely from below.

As shown in FIGS. 5A and 5B, the key guide 54 of the decision button 50 is a member of a substantially angular cylindrical shape and is formed from, for example, a high-impact polystyrene (HIPS) resin. The key guide 54 has a first box-shaped portion 54*a* which is opened upwards and plate-shaped projecting portions 54*b* which each project downwards substantially into a plate shape from both front and rear sides of a lower surface 54*a*2 of the first box-shaped portion 54*a*. Four corners of the first box-shaped portion 54*a* are each formed into an angularly rounded shape. The plate-shaped projecting portions 54*b* are each provided in such a posture that both plate surfaces thereof are oriented so as to follow the front-rear direction and have the same projecting dimension by which the plate-shaped projecting portions 54*b* extend downwards from the first box-shaped portion 54*a*. A distal end of each plate-shaped projecting portion 54*b* (a lower end of the key guide 54) is formed into a flat surface, which is then made into an abutment portion 54*b*1 configured to be brought into abutment with the upper surface 60*a* of the circuit board 60 as a result of a push operation being performed on the push surface 52*a*1 of the key top 52.

In addition, a dislocation prevention portion 54*c* for preventing a dislocation of the key guide 54 from the rubber key 56, which will be described later, is provided at a substantially central portion in the left-right direction on an outer surface of each plate-shaped projecting portion 54*b*. Each dislocation prevention portion 54*c* has an inclined surface 54*c*1 which is caused to incline upwards from the abutment portion 54*b*1. An upper end surface of each dislocation prevention portion 54*c* is provided flat from an upper end of the inclined surface 54*c*1 to the outer surface of the plate-shaped projecting portion 54*b* so as to be made into a dislocation prevention surface 54*c*2, which is configured to be brought into abutment with the rubber key 56 to thereby prevent a dislocation of the key guide 54 therefrom. Additionally, a guide-side projecting portion (a second pressing projecting portion) 54*d* is provided at a substantially central portion of the lower surface 54*a*2 of the first box-shaped portion 54*a* in such a manner as to project downwards into a substantially circular cylindrical shape. That is, the guide-side projecting portion 54*d* is provided on a pushing axis A1 of the key guide 54. The pushing axis A1 is along with the Z-axis and passes through a center of the key guide 54 in the X-Y plane. The guide-side projecting portion 54*d* presses on a part of the rubber key 56 as a result of a push operation being performed on the push surface 52*a*1 of the key top 52.

As shown in FIGS. 6A to 8, the rubber key 56 of the decision button 50 is an elastic member of a substantially angular cylindrical shape (hollowed shape) and is formed from, for example, a silicone rubber. The rubber key 56 has a first angular cylindrical portion (a fixed portion) 56*a* of a substantially angular cylindrical shape, a second box-shaped portion (a support portion) 56*b* of a substantially angular cylindrical shape, which is provided inside the first angular cylindrical portion 56*a* and is opened upwards, and a second protruding portion 56*c*, which protrudes outwards from a lower edge portion of the first angular cylindrical portion 56*a* into the form of a collar. Four corners of each of the first angular cylindrical portion 56*a* and the second box-shaped portion 56*b* are each formed into an angularly rounded shape. The second box-shaped portion 56*b* is connected with an upper end portion 56*a*1 of the first angular cylindrical portion 56*a* by a hinge portion (a connecting portion) 56*d* which extends from a position situated slightly downwards of an upper end portion 56*b*1 of the second box-shaped portion 56*b*.

The hinge portion 56*d* is provided in such a manner as to extend along a full circumference of an upper end of the first angular cylindrical portion 56*a*. As a result, in a plan view of the rubber key 56, a space defined between the first angular cylindrical portion 56*a* and the second box-shaped portion 56*b* is filled with the hinge portion 56*d* without any gap therebetween. The hinge portion 56*d* is made very much thinner than the first angular cylindrical portion 56*a* and the second box-shaped portion 56*b*, as a result of which the second box-shaped portion 56 is permitted to move in the up-down direction relative to the first angular cylindrical portion 56*a* due to an elastic deformation of the hinge portion 56*d*. In the normal state, the upper end portion 56*b*1 of the second box-shaped portion 56*b* is positioned upwards of the upper end portion 56*a*1 of the first angular cylindrical portion 56*a*, and the hinge portion 56*d* between the first angular cylindrical portion 56*a* and the second box-shaped portion 56*b* is made to stay in a downwardly recessed state.

Figure 6A:
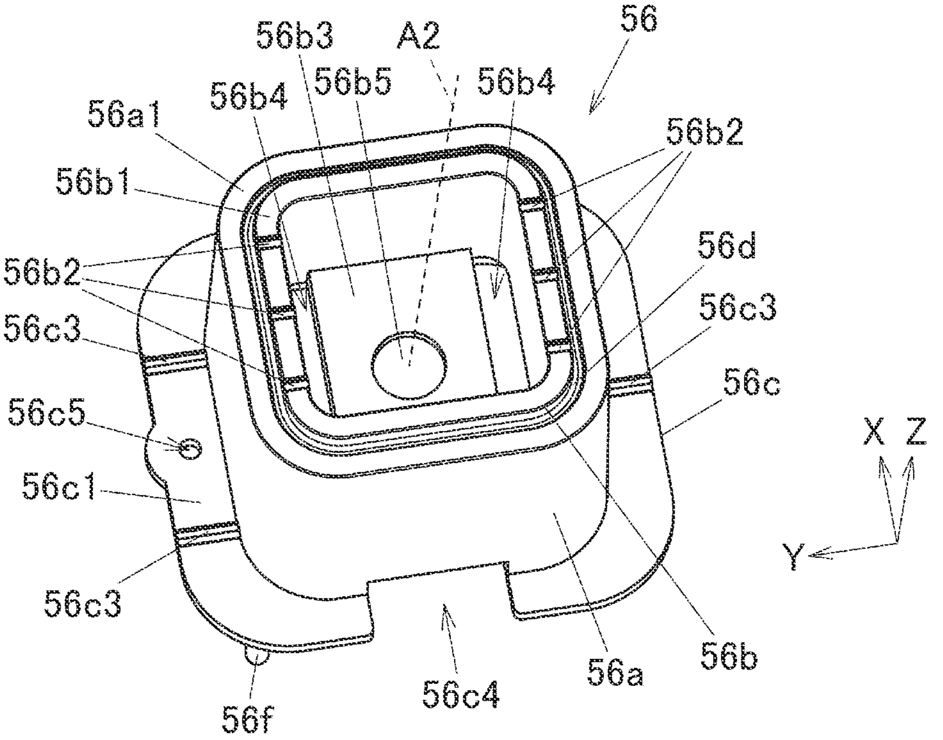
FIG. 6A is a perspective view of a rubber key of the decision button according to the embodiment, resulting when the rubber key is seen obliquely from above.

As shown in FIG. 6A, six minute first projections (projecting portions) 56*b*2, which each project upwards into an angle shape as viewed from the front-rear direction, are provided on both front and rear portions of the upper end portion 56*b*1 (an end portion facing the key top 52) of the second box-shaped portion 56*b*. In the six first projections 56*b*2, three first projections 56*b*2 are provided at substantially equal intervals on the front portion, and three first projections 56*b*2 are provided at substantially equal intervals on the rear portion of the upper end portion 56*b*1. In other words, the three first projections 56*b*2 on the front portion and the three first projections 56*b*2 on the rear portion are provided opposite to each other across a pushing axis A2 of the rubber key 56. The pushing axis A2 is along with the Z-axis and passes through a center of the rubber key 56 in the X-Y plane. A base of the second box-shaped portion 56*b* is made into a support surface 56*b*3 for supporting the key guide 54. An opening is provided individually in both front and rear sides of the support surface 56*b*3. These openings are opened one size larger than an outer circumference of each plate-shaped projecting portion 54*b* of the key guide 54 and are each made into a passage opening 56*b*4 through which the corresponding plate-shaped projecting portion 54*b* is passed in the up-down direction.

A circular recessed portion 56*b*5, which is recessed substantially into a circular shape, is provided at a substantially central portion of an upper surface of the support surface 56*b*3. The circular recessed portion 56*b*5 is provided one size larger than an outer circumference of the guide-side projecting portion 54*d* of the key guide 54, so that the guide-side projecting portion 54*d* fits in the circular recessed portion 56*b*5. A depth dimension of the circular recessed portion 56*b*5 is made substantially equal to a projecting dimension of the guide-side projecting portion 54*d*. On the other hand, a rubber-side projecting portion (a first pressing projecting portion) 56*e*, which projects downwards into a substantially circular cylindrical shape, is provided at a substantially central portion on a lower surface of the support surface 56*b*3. That is, the rubber-side projecting portion 56*e* is provided on the pushing axis A2 of the rubber key 56. The rubber-side projecting portion 56*e* is provided one size smaller than the outer circumference of the guide-side projection portion 54*d* of the key guide 54. The rubber-side projecting portion 56*e* presses on the moving contact module 62*b* of the button unit 62 provided on the circuit board 60 as a result of a push operation being performed on the push surface 52*a*1 of the key top 52.

Figure 6B:
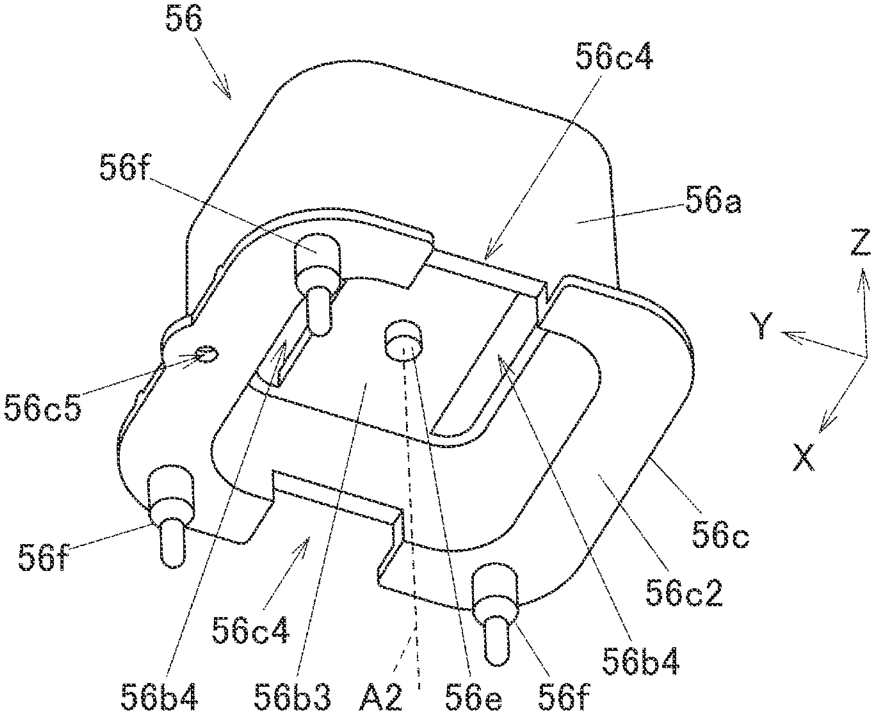
FIG. 6B is a perspective view of the rubber key of the decision button according to the embodiment, resulting when the rubber key is seen obliquely from below.

The second protruding portion 56*c* is brought into abutment with the upper surface 60*a* of the circuit board 60 on a lower surface 56*c*2 thereof. As shown in FIG. 6B, three minute second projections 56*c*3, which each project upwards into an angle shape as viewed from the front-rear direction, are provided on both front and rear portions of an upper surface 56*c*1 of the second protruding portion 56*c*. In the three second projections 56*c*3, two second projections 56*c*3 are provided on the front portion, and one second projection 56*c*3 is provided on the rear portion. A first cut-out 56*c*4, which is cut out into a substantially rectangular shape, is provided in a substantially central portion in the front-rear direction on each of left and right portions of the second protruding portion 56*c*. Each cut-out 56*c*4 is cut out accordingly along a lower edge portion of the first angular cylindrical portion 56*a*.

A substantially circular passage hole 56*c*5, through which a restriction pin 58*e* of the light guide 58, which will be described later, is provided in a substantially central portion in the left-right direction of the front portion of the second protruding portion 56*c*. A circuit board-side cut-out 60*d*, which is formed by cutting out a part of a front end portion of the circuit board 60, is provided in a position on the circuit board 60 which corresponds to the passage hole 56*c*5 in the up-down direction (refer to FIG. 4). Three fixing pins 56*f*, which each project downwards in the form of a pin, are provided on the lower surface 56*c*2 of the second protruding portion 56*c*. The three fixing pins 56*f* are provided individually in three corner portions in four corners of the lower surface 56*c*2. On the other hand, attachment holes 60*c*, through which the fixing pins 56*f* are configured to be passed individually for attachment, are provided in the circuit board 60 in positions which correspond individually to the fixing pins 56*f* in the up-down direction (refer to FIG. 4).

As shown in FIG. 4, the light guide 58 of the decision button 50 is a member of a substantially angular cylindrical shape. The light guide 58 is formed one size larger than the rubber key 56 and has a light transmission property. The light guide 58 is formed from, for example, a polycarbonate. The light guide 58 has a second angular cylindrical portion 58*a* of a substantially angular cylindrical shape, an annular portion of a substantially angular ring shape (a surrounding portion) which protrudes upwards from an upper end portion of the second angular cylindrical portion 58*a*, and a third protruding portion 58*c* which protrudes outwards in the form of a collar from a lower end edge portion of the second angular cylindrical portion 58*a*. Four corners of the second angular cylindrical portion 58*a* are each formed into an angularly rounded shape. An opening dimension of the annular portion 58*b* is made slightly larger than a width dimension of the square plate portion 52*a* of the key top 52. An upper end edge portion of the annular portion 58*b* is embossed along a full circumference thereof.

Figure 8:
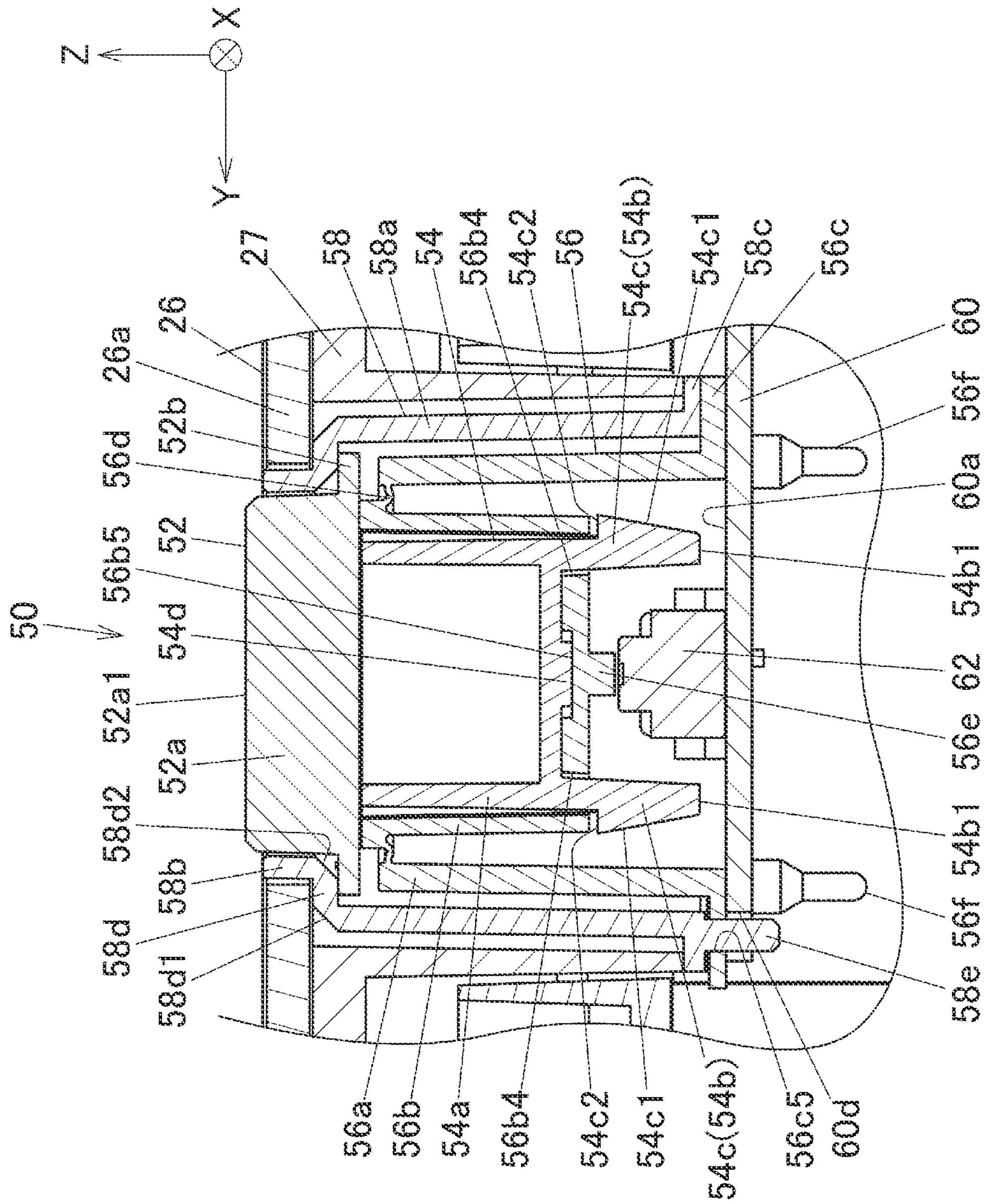
FIG. 8 is a sectional view in the front-rear direction of the decision key according to the embodiment.

As shown in FIGS. 7 and 8, an inclined portion 58*d*, which inclines upwardly and inwardly, is provided at a boundary portion between the second angular cylindrical portion 58*a* and the annular portion 58*b*. An opening diameter of the light guide 58 is slightly narrowed from the second angular cylindrical portion 58*a* to the annular portion 58*b* by the inclined portion 58*d* so provided. A surface of the inclined portion 58*d* which is directed outwards of the light guide 58 constitutes a first reflection surface 58*d*1, and a surface of the light guide 58 which is directed inwards of the light guide 58 constitutes a second reflection surface 58*d*2. Inclined angles (acute angles) of the first reflection surface 58*d*1 and the second reflection surface 58*d*2 with respect to an axis direction of the second angular cylindrical portion 58*a* are 45 degrees. The axis direction of the second angular cylindrical portion 58*a* is along with the Z-axis and passes through a center of the light guide 58 in the X-Y plane.

A mirror finishing is applied to respective front surfaces of both the first reflection surface 58*d*1 and the second reflection surface 58*d*2.

The third protruding portion 58*c* is disposed on the second protruding portion 56*c* of the rubber key 56. A second cut-out 58*c*1, which is cut out into a substantially rectangular shape, is provided in a substantially central portion in the front-rear direction of each of left and right portions of the third protruding portion 58*c*. A restriction pin 58*e*, which projects downwards into a pin shape, is provided at a substantially central portion in the left-right direction of a lower surface of the front portion of the third protruding portion 58*c* (refer to FIGS. 4 and 8). The restriction pin 58*e* is passed through the passage hole 56*c*5 of the rubber key 56 so to fit in the circuit board-side cut-out 60*d* of the circuit board 60, whereby a movement of the light guide 58 in the left-right direction is restricted.

Next, referring to FIGS. 7 and 8, an assembling form of the individual members making up the decision button 50 will be described. The key guide 54 is placed in the rubber key 56 by the pair of plate-shaped projecting portions 54*d* being passed through the corresponding passage openings 564*b* of the rubber key 56 from above. The pair of plate-shaped projecting portions 54*b* are passed through the passage openings 564*b* to such an extent that the lower surface 54*a*2 of the first box-shaped portion 54*a* comes into abutment with an upper side of the support surface 56*b*3 of the rubber key 56. Here, when the individual dislocation prevention portions 54*c* of the key guide 54 pass through the corresponding passage openings 56*b*4, an inner surface of the second box-shaped portion 56*b* of the rubber key 56 is pressed on by the respective inclined surfaces 54*c*1 of the dislocation prevention portions 54*c*, whereby the inner surface of the second box-shaped portion 56*b* is elastically deformed outwards. Then, when the individual dislocation prevention portions 54*c* are passed through the corresponding passage openings 56*b*4, the inner surface of the second box-shaped portion 56*b* of the rubber key 56 is elastically restored, whereby the respective dislocation prevention surfaces 54*c*2 of the dislocation prevention portions 54*c* face the lower surface of the second box-shaped portion 56*b* of the rubber key 56.

The key guide 54 is supported in place inside the rubber key 56 by the pair of plate-shaped projecting portions 54*b* being passed through the corresponding passage openings 56*b*4, and the guide-side projecting portion 54*d* fits in the circular recessed portion 56*b*5 of the rubber key 56, whereby a distal end portion of the guide-side projecting portion 54*d* is brought into abutment with a base of the circular recessed portion 56*b*5. As a result, the key guide 54 is assembled in the rubber key 56. In this state, the pushing axis A1 of the key guide 54 and the pushing axis A2 of the rubber key 56 substantially coincide with each other, and a position of an upper end portion of the first box-shaped portion 54*a* of the key guide 54 in the up-down direction and a position of the upper end portion 56*b*1 of the second box-shaped portion 56*b* of the rubber key 56 in the up-down direction substantially coincide with each other. As a result, the first projecting portions 56*b*2 (not shown in FIGS. 7 and 8) of the rubber key 56 are being left projecting further upwards than an upper end of the first box-shaped portion 54*a*. In addition, in this state, the respective dislocation prevention surfaces 54*c*2 of the dislocation prevention portions 54*c* face a lower surface of the second box-shaped portion 56*b*, which is the lower surface of the support surface 56*b*3, of the rubber key 56 closely, whereby the plate-shaped projecting portions 54*b* of the key guide 54 are prevented from being dislocated from the corresponding passage openings 56*b*4 of the second box shaped portion 56*b* of the rubber key 56.

The rubber key 56, to which the key guide 54 is now assembled, is attached onto the circuit board 60. Specifically speaking, the three fixing pins 56*f* provided on the rubber key 56 are individually inserted into the three corresponding attachment holes 60*c*, which are provided in a front portion of the circuit board 60, whereby the rubber key 56 is attached onto the circuit board 60. The rubber key 56 is restricted from being moved along the plate surface of the circuit board 60 as a result of the rubber key 56 being attached onto the circuit board 60 in such a way. Then, a distal end portion (a lower surface) of the rubber-side projecting portion 56*e* of the rubber key 56 is being positioned above the button unit 62 provided on the front portion of the circuit board 60 closely. The two LEDs 64 provided at the front portion of the circuit board 60 are individually being positioned inside the corresponding first cut-outs 56*c*4 of the rubber key 56, whereby light emitting sides of the LEDs 64 are exposed upwards of the rubber key 56.

The key top 52 is placed on the rubber key 56 in such a state that the rubber key 56 is attached onto the circuit board 60. That is, the key top 52 is brought into abutment with distal end portions of the first projections 56*b*2 provided on the rubber key 56 on a lower surface thereof. In this way, since the key top 52 is placed only above the rubber key 56 with a slight gap defined between the key guide 54 and itself, for example, in the case that sounds are outputted from the electronic keyboard instrument 1, vibrations associated with the sounds so outputted are absorbed by the rubber key 56 having an elastic force, whereby the resonance of the key top 52 is prevented or suppressed. Projecting heights of the individual first projections 56*b*2 can be adjusted in accordance with an assemblage tolerance of the individual members making up the decision button 50 so that the push surface 52*a*1 of the key top 52 which is placed on the first projections 56*b*2 becomes level (or follows a panel surface of the upper panel 26*a*).

The light guide 58 is assembled in such a manner as to cover the rubber key 56 attached onto the circuit board 60. Specifically speaking, the light guide 58 is assembled in place over the rubber key 56 as a result of the restriction pin 58*e* provided on the light guide 58 being passed through the passage opening 56*c*5 of the rubber key 56 so as to fit in the circuit board-side cut-out 60*d* of the circuit board 60. The light guide 58 so assembled is restricted from moving in the left-right direction but is permitted to move in the front-rear direction while resisting the elastic force of the rubber key 56. In other words, the light guide 58 is held on the rubber key 56 in such a manner as to move in the front-rear direction along the push surface 52*a*1. In this state, the second angular cylindrical portion 58*a* of the light guide 58 surrounds the first angular cylindrical portion 56*a* of the rubber key 56 in such a state that a gap is defined between the first angular cylindrical portion 56*a* of the rubber key 56 and itself. Then, the annular portion 58*b* of the light guide 58 surrounds the square plate portion 52*a* in such a state that an inner surface thereof is in abutment with (or close to) the square plate portion 52*a*. The push surface 52*a*1 of the key top 52 is exposed upwards.

In addition, as a result of the light guide 58 being assembled in the way described above, the lower surface of the inclined portion 58*d* of the light guide 58 is brought into abutment with the first protruding portion 52*b* of the key top 52. In other words, the first protruding portion 52*b* protrudes outwards of the annular portion 58*b* of the light guide 58 and is disposed on a lower side (a side facing the push direction) of the annular portion 58*b*. As a result, the key top 52 is prevented from being dislocated upwards of the light guide 58. The two LEDs 64 provided at the front portion of the circuit board 60 are individually positioned inside the corresponding second cut-outs 58*c*1 of the light guide 58 and are being superposed on a lower end of the second angular cylindrical portion 58*a* in the up-down direction. Due to this, light emitted from the two LEDs 62 provided at the front portion of the circuit board 60 is incident on the lower end of the second angular cylindrical portion 58*a*. Thus, the decision button 50 is assembled onto the circuit board 60 by following the procedure that has been described heretofore.

Then, the circuit board 60, onto which the decision button 50 (as well as the first setting button 30 and the second setting button 40) is now assembled, is attached to the inner frame 27 of the left case 26 by, for example, being fastened thereto with screws. As a result, the decision button 50 is fixedly held between the circuit board 60 and the upper panel 26*a* in such a state that an upper surface of the inclined portion 58*d* of the light guide 58 is brought into abutment with a lower surface of an opening end of the setting opening portion 26*a*2 of the left case 26, and that the push surface 52*a*1 and an upper edge portion of the annular portion 58*b* of the light guide 58 are exposed upwards from the setting opening portion 26*a*2. The annular portion 58*b* is interposed between the square plate portion 52*a* of the key top 52 and the upper panel 26*a* of the left case 26. In addition, the third protruding portion 58*c* of the light guide 58 is held between the second protruding portion 56*c* of the rubber key 56 and the inner frame 27.

Next, referring to FIGS. 8 to 10, a function of the decision button 50 when the user pushes down the push surface 52*al* of the decision button 50 will be described below. As shown in FIG. 8, in the normal state, the rubber-side projecting portion 56*e* of the rubber key 56 is spaced apart from the button unit 62 in such a state that a slight gap is defined between and the button unit 62 and itself. Additionally, the abutment portions 54*b*1 of the key guide 54 are spaced apart from the upper surface 60*a* of the circuit board 60. As shown in an enlarged sectional view E1 in FIG. 9C, in the normal state, a thickness dimension T1 of the rubber-side projecting portion 56*e* of the rubber key 56 is set larger than a thickness dimension T2 of the guide-side projecting portion 54*d* of the key guide 54, and a width dimension W1 of the rubber-side projecting portion 56*e* is set smaller than a width dimension W2 of the guide-side projecting portion 54*d*.

Figures 9A, 9B, 9C:
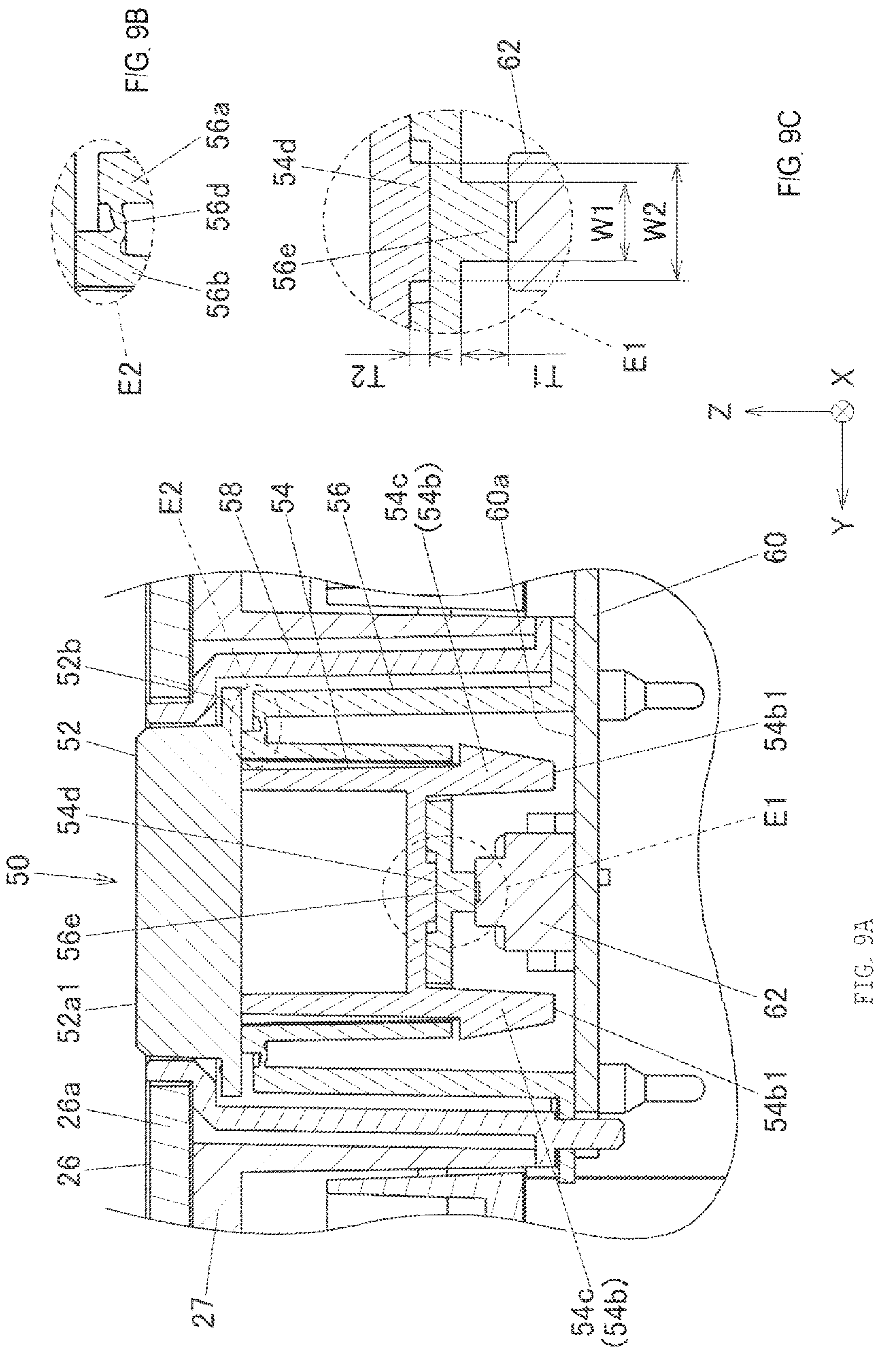
FIGS. 9A-9C show a sectional view in the front-rear direction of the decision key according to the embodiment showing a state in which a key top is pushed down halfway, in which E1 is an enlarged sectional view showing a circumference of a rubber-side projecting portion and a guide-side projecting portion, and E2 is an enlarged sectional view showing a circumference of a hinge portion.

As shown in FIGS. 9A-9C, when the push surface 52*a*1 is pushed down halfway from the normal state, a distal end portion of the rubber-side projecting portion 56*e* is brought into abutment with the button unit 62 (hereinafter, the state shown in FIGS. 9A-9C will be referred to as a "first push state"). In sifting from the normal state to the first push state, the first protruding portion 52*b* of the key top 52 moves away from the inclined portion 58*d* of the light guide 58 as a result of the push surface 52*a*1 being pushed down, whereby the rubber key 56 is pushed downwards by the key top 52. As a result, the hinge portion 56*d*, which is provided on the side of the rubber key 56 which faces the key top 52, is elastically deformed (refer to an enlarged sectional view E2 in FIG. 9B), and the lower surface of the key top 52 is brought into abutment with an upper end of the key guide 54, whereby not only the rubber key 56 but also the key guide 54 is pushed downwards by the key top 52 to move accordingly. As a result of the key guide 54 moving downwards, the individual plate-shaped projecting portions 54*b* of the key guide 54 move towards the circuit board 60, and the rubber-side projecting portion 56*e* is pushed downwards by the guide-side projecting portion 54*d* so as to be brought into abutment with the button unit 62.

Figures 10A, 10B, 10C:
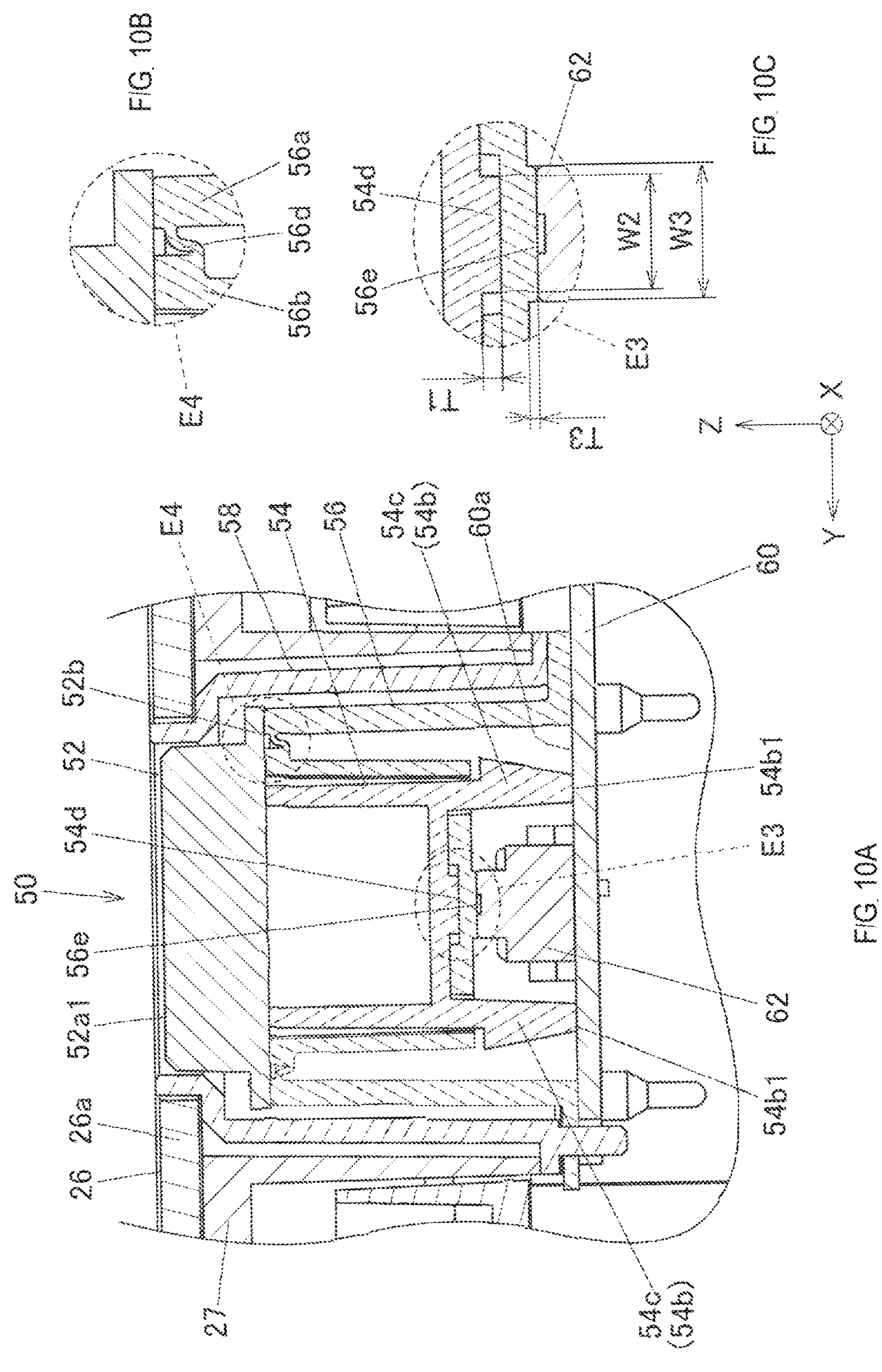
FIGS. 10A-10C show a sectional view in the front-rear direction of the decision key according to the embodiment showing a state in which the key top is pushed down to a lower limit position, in which E3 is an enlarged sectional view showing the circumference of the rubber-side projecting portion and the guide-side projecting portion, and E4 is an enlarged sectional view showing the circumference of the hinge portion.

As shown in FIGS. 10A-10C, when the push surface 52*a*1 is pushed down further from the first push state, the rubber key 56 is pushed downwards further by the key top 52, whereby the hinge portion 56*d* is elastically deformed further to flex downwards (refer to an enlarged sectional view E4 in FIGS. 10B). Then, the abutment portions 54*b*1 of the key guide 54 are brought into abutment with the circuit board 60, and the lower surface of the key top 52 is brought into abutment with the upper end of the first angular cylindrical portion 56*a* of the rubber key 56, resulting in a lower limit state in which the push surface 52*a*1 cannot be pushed down any further (hereinafter, the state shown in FIGS. 10A-10C FIG. 10 will be referred to as a "second push state"). In the second push state, the push surface 52*a*1 is positioned lower than the panel surface of the upper panel 26*a*.

In sifting from the first push state to the second push state, the rubber-side projecting portion 56*e*, which is provided on the side of the rubber key 56 which faces the button unit 62, is pressed downwards further from an upper side (a side opposite to the side facing the button unit 62) by the guide-side projecting portion 54*d*, whereby the rubber-side projecting portion 56*e* presses downwards the moving contact module 62*b* of the button unit 62 while being compressed (elastically deformed) in the up-down direction between the guide-side projecting portion 54*d* and the button unit 62. The function of the decision button 50 is switched on and off as a result of the moving contact module 62*b* being pressed downwards by the rubber-side projecting portion 56*e*. When the push surface 52*a*1 is pushed down in the way described above, the rubber-side projecting portion 56*e* is pushed down via the key guide 54, whereby the button unit 62 is pressed down. When the finger is released from the push surface 52*a*1 as the push operation is completed, the individual members making up the decision button 50 are restored to their original positions in the normal state by means of an elastic restoration force of the rubber-side projecting portion 56*e*.

Thus, as a result of the rubber-side projecting portion 56*e* being compressed in the way as has been described above, as shown in an enlarged sectional view E3 in FIGS. 10C, in the second push state, a thickness dimension T3 of the rubber-side projecting portion 56*e* so compressed becomes smaller than the thickness dimension T2 of the guide-side projecting portion 54*d*, and a width dimension W3 of the rubber-side projecting portion 56*e* so compressed becomes larger than the width dimension W2 of the guide-side projecting portion 54*d*. In this way, the pressing force by which the moving contact module 62*b* is pressed down by the rubber-side projecting portion 56*e* can be made optimum by adjusting the thickness dimensions and the width dimensions of the guide-side projecting portion 54*d* and the rubber-side projecting portion 56*e* in the normal state in accordance with a degree of a pressing force which is applied to the rubber-side projecting portion 56*e* when the rubber-side projecting portion 56*e* is pushed downwards (a degree of compression of the rubber-side projecting portion 56*e*), a moving distance of the key guide 54 when the rubber-side projecting portion 56*e* is pushed downwards, and the like.

Figure 11A:
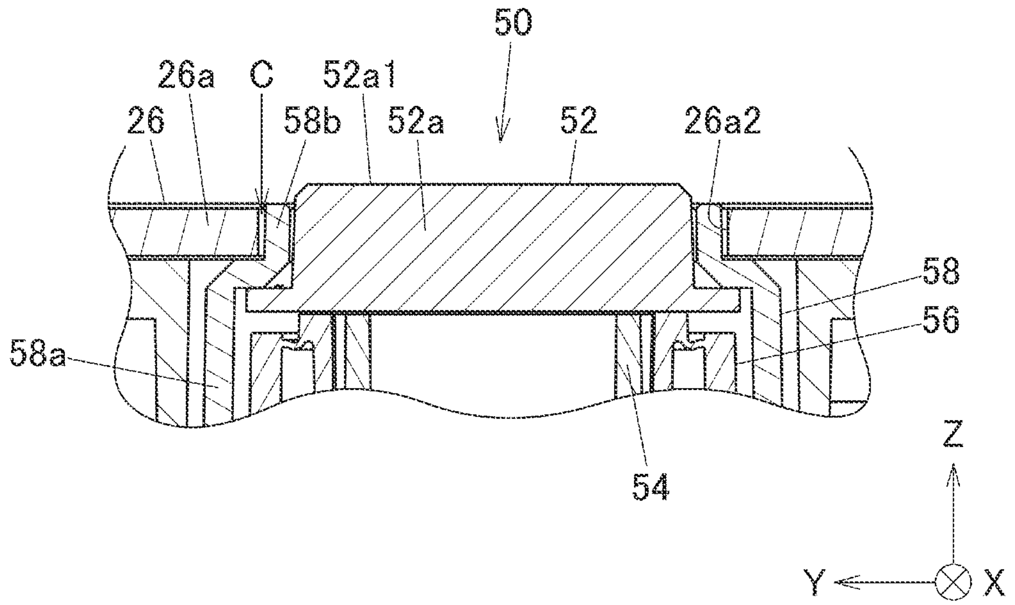
FIG. 11A is a sectional view in the front-rear direction of a circumference of the key top of the decision button according to the embodiment showing a state in which the key top stays in a normal position.
Figure 11B:
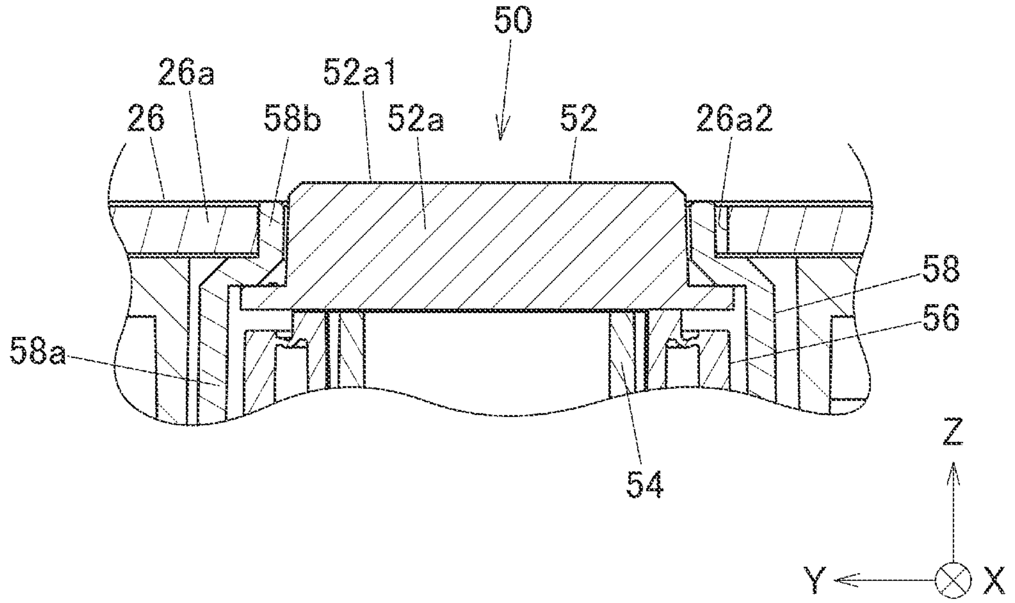
FIG. 11B is a sectional view in the front-rear direction of the circumference of the key top of the decision button according to the embodiment showing a state in which the key top deviates in position in the front-rear direction.

Here, there may be a case in which the upper panel 26*a* having provided therein the setting opening portion 26*a*2 from which the push surface 52*a*1 of the decision button 50 is exposed expands or contracts due to a temperature environment on the circumference of the electronic keyboard instrument 1. As show in FIG. 11A, in the case of the decision button 50 of the present embodiment, a gap is defined between the annular portion 58*b* of the light guide 58 and the upper panel 26*a*. As a result, as shown in FIG. 11B, even though the position of an opening end of the setting opening portion 26*a*2 deviates towards the rear due to an expansion of the upper panel 26*a* or the like, a risk of the light guide 58 being pushed by the upper panel 26*a* is prevented or suppressed. Additionally, since the light guide 58 is permitted to move in the front-rear direction as described above, even though the annular portion 58*b* is pushed by the upper panel 26*a* as a result of the opening end of the setting opening portion 26*a*2 being caused to deviate in position largely in the front-rear direction, the light guide 58 moves in the front-rear direction in the front-rear direction so as to absorb the positional deviation. In this way, the decision button 50 of the present embodiment is prevented or restrained from being affected by the expansion or contraction of the upper panel 26*a*.

Figure 12:
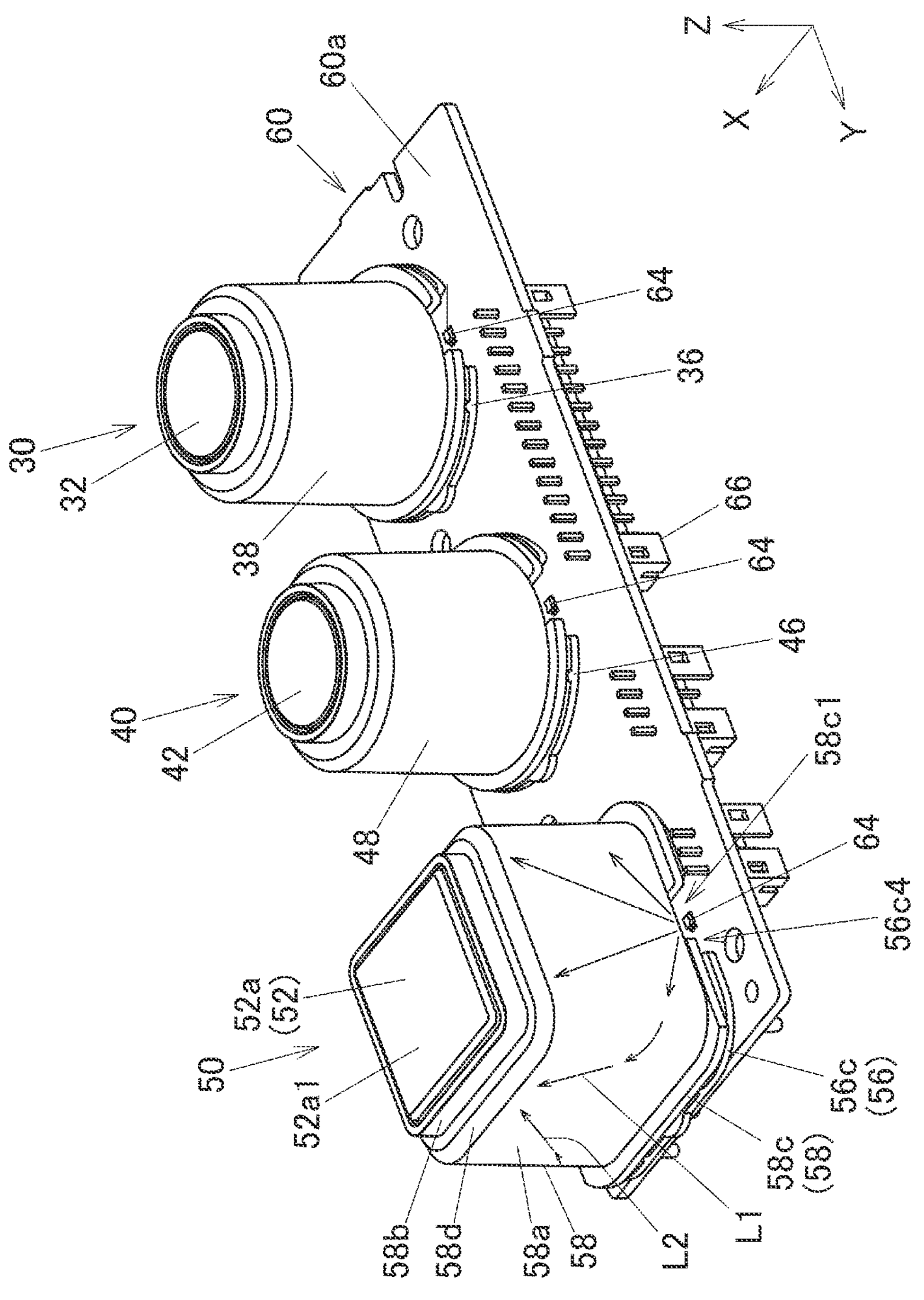
FIG. 12 is a perspective view of the button group of the electronic keyboard instrument according to the embodiment showing a light guiding form in which light from light emitting diodes (LEDs) in the decision button is guided.

Next, referring to FIGS. 7 and 12, a light guiding mode will be described in which light emitted from the two LEDs 64 provided at the front portion of the circuit board 60 is guided. Lights (denoted individually by reference symbols L1, L2) emitted from the individual LEDs 64 enter the light guide 58 from the corresponding second cut-outs 58*c*1 of the light guide 58 so as to be incident on the lower end of the second angular cylindrical portion 58*a*. The lights L1, L2 which have entered the second angular cylindrical portion 58*a* are radially diffused upwards along the second angular cylindrical portion 58*a* by a light diffusing agent applied to the material and eventually arrive at the first reflection surface 58*d*1 of the inclined portion 58*d*.

Light axes of the individual lights L1, L2 which have now arrived at the first reflection surface 58*d*1 are turned inwards through 90 degrees (towards the second reflection surface 58*d*2) by the first reflection surface 58*d*1, and the lights L1, L2 so turned are then diffused while being reflected and eventually arrive at the second reflection surface 58*d*2. The light axes of the individual lights L1, L2 which have arrived at the second reflection surface 58*d*2 are turned upwards through 90 degrees (towards the annular portion 58*b*), and the lights L1, L2 so turned are then diffused while being reflected and are eventually emitted outwards of the upper panel 26*a* from the upper end of the annular portion 58*b*. Then, the user can see the lights L1, L2 emerging from the upper end of the annular portion 58*b* to the outside of the upper panel 26*a*.

Thus, as has been described heretofore, the decision button 50 of the present embodiment includes the key top 52 on which a push operation can be performed, the substantially cylindrical rubber key 56 which is provided on the side of the key top 52 which faces the push direction and which is configured to be elastically deformed on the side thereof which faces the key top 52 in response to the push operation which is performed on the key top 52, the button unit 62 configured to detect the push operation performed on the key top 52, and the key guide 54 which is supported by the rubber key 56 inside the rubber key 56 and which is configured to move in the push direction in response to the push operation performed on the key top 52. Then, the side of the rubber key 56 which faces the button unit 62 is elastically deformed as a result of the guide key 54 moving in response to the push operation.

In this way, with the decision button 50, when the user pushes down the key top 52, the key top 52 does not directly push down the rubber key 56, but the key guide 54 supported inside the rubber key 56 is pushed down to move in the push direction by the key top 52 while the side of the rubber key 56 which faces the key top 52 is being elastically deformed. Then, the side of the rubber key 56 which faces the button unit 62 is elastically deformed by the movement of the key guide 54, whereby the button unit 62 is pressed to thereby detect the push operation performed on the key top 52. As a result, a touching feel of the key guide 54 which is harder than the rubber key 56 is transmitted to the finger of the user when the user pushes down the key top 52, while the push operation is performed smoothly by the elastic deformation of the rubber key 56, and there is no such case that the elastic force of the rubber key 56 is transmitted directly to the finger. As a result, with the decision button 50 of the present embodiment, the user can sense a good clicking feel when the user touches the key top 52.

In addition, with the decision button 50 described above, the rubber key 56 has the rubber-side projecting portion **56*e* configured to press the button unit 62 in response to the bush-down operation performed on the key top 52, and the key guide 54 has the guide-side projecting portion 54*d* configured to press the rubber-side projecting portion 56*e* from the opposite side to the side facing the button unit 62 in response to the push operation performed on the key top 52. With this configuration, the button unit 62 can be pressed effectively by the rubber-side projecting portion 56*e*, and the rubber-side projecting portion 56*e*, which constitutes the part of the rubber key 56, can be elastically deformed in an effective fashion by the guide-side projecting portion 54*d***.

With the decision button 50 described above, the rubber-side projecting portion **56*e* and the guide-side projecting portion 54*d* have the substantially circular cylindrical shape, and in the normal state in which the rubber-side projecting portion 56*e* does not press the button unit 62, the thickness dimension T1 of the rubber-side projecting portion 56*e* is larger than the thickness dimension T2 of the guide-side projecting portion 54*d*, and the width dimension W1 of the rubber-side projecting portion 56*e* is smaller than the width dimension W2 of the guide-side projecting portion 54*d*. In this way, the thickness dimensions and the width dimensions of the guide-side projecting portion 54*d* and the rubber-side projecting portion 56*e* in the normal state can be adjusted in accordance with the degree of the pressing force by which the moving contact module 62*b* of the button unit 62 is to be pressed, the degree of hardness of the rubber key 56, the moving distance of the key guide 54 when the rubber-side projecting portion 56*e* is pushed downwards, and the like. As a result, the pressing force by which the rubber-side projecting portion 56*e* presses on the button unit 62** can be made optimum.

With the decision button 50 described above, the rubber-side projecting portion **56*e* is provided on the pushing axis A2 of the rubber key 56, and the guide-side projecting portion 54*d* is provided on the pushing axis A1 of the key guide 54, the pushing axis A2 of the rubber-side projecting portion 56*e* and the pushing axis A1 of the guide-side projecting portion 54*d* substantially coinciding with each other. According to this configuration, when the key guide 54 is pushed down via the key top 52, the push force then is transmitted substantially uniformly to the rubber-side projecting portion 56*e* and the guide-side projecting portion 54*d*. As a result, when the key top 52** is pushed down, the user can sense the good clicking feel.

In addition, with the decision button 50 described above, the first projections **56*b*2 are provided at the six locations on the side of the rubber key 56 which faces the key top 52 in such a manner that the first projections 56*b*2 project towards the key top 52 and the distal end portions thereof are brought into abutment with the key top 52, and the three first projections 56*b*2 and the other three first projections 56*b*2 are provided opposite to each other across the pushing axis A2 of the rubber key 56. With this configuration, the horizontal state or levelness of the key top 52 with which the distal end portions of the individual first projections 56*b*2 are brought into abutment can be adjusted by adjusting the projecting height of the first projections 562*b* in accordance with the assemblage tolerance of the individual members which make up the decision button 50. As a result, the clicking feel can be improved which the user would sense when he or she pushes down the key top 52**.

With the decision button 50 described above, the decision button 50 includes the circuit board 60 on which the button unit 62 is provided, and the key guide 54 is supported by the rubber key 56 in such a state that the key guide 54 is left apart from the plate surface of the circuit board 60 and has the abutment portion **54*b*1 configured to be brought into abutment with the plate surface of the circuit board 60 in response to the push operation performed on the key top 52. With this configuration, since the key guide 54 is prevented from moving any further towards the circuit board 60 (towards the button unit 62) by the abutment of the abutment portion 54*b*1 with the plate surface of the circuit board 60, there is no such a case in which the push surface 52*a*1 is pushed down excessively. This can prevent a reduction in the elastic force of the rubber key 56 as well as the damage to the rubber-side projecting portion 56*e*, the guide-side projecting portion 54*d*, and the button unit 62 which would both be caused by the push surface 52*a*1** being pushed down excessively.

In addition, with the decision button 50 described above, the rubber key 56 has the first angular cylindrical portion **56*a* which is fixed to the plate surface of the circuit board 60, the second box-shaped portion 56*b* configured to support the key guide 54, and the hinge portion 56*d* which connects the first angular cylindrical portion 56*a* and the second box-shaped portion 56*b* together, and the second box-shaped portion 56*b* moves relatively to the first angular cylindrical portion 56*a* in the push direction as a result of the hinge portion 56*d* being elastically deformed in response to the push operation performed on the key top 52. This can realize the specific configuration for moving the second box-shaped portion 56*b* of the rubber key 56 towards the button unit 62 in such a state that the rubber key 56 is fixed to the plate surface of the circuit board 60**.

With the decision button 50 described above, the key top 52 has the push surface **52*a*1 on which the push operation is performed, and the light guide 58 is provided which has the annular portion 58*b* which surrounds the circumference of the push surface 52*a*1 and which is configured to guide light emitted from the LEDs 64 towards the annular portion 58*b*. According to this configuration, light emitted from the LEDs 64 is guided towards the annular portion 58*b* by the light guide 58 and is then emitted to the outside of the decision button 50 from the circumference of the push surface 52*a*1. As a result, the user can see the light from the LEDs 64** emerging from the circumference of the push surface 52_a_1, thereby making it possible to improve the visual effect and visibility of the decision button 50.

With the decision button 50 described above, the light guide 58 is held on the rubber key 56 in such a manner as to be permitted to move in at least one direction along the push surface 52_a_1. According to this configuration, even in the event that the light guide 58 is pushed by the member which surrounds the decision button 50, for example, as a result of a positional deviation of that member, the positional deviation of the member is absorbed by the movement of the light guide 58 in the direction along the push surface 52_a_1. As a result, it becomes possible to prevent or restrain the members making up the decision button 50 from being affected by the positional deviation of the member which surrounds the circumference of the decision button 50.

With the decision button 50 described above, the key top 52 has the first protruding portion 52_b_ which protrudes to the outside of the push surface 52_a_1 and which is provided on the side of the annular portion 58_b_ of the light guide 58 where the annular portion 58_b_ is pushed down. With this configuration, in the case that the key top 52 moves to an opposite side to the push direction, the first protruding portion 52_b_ interferes with the annular portion 58_b_ of the light guide 58. This can prevent the key top 52 from being dislocated to the opposite side to the push direction for removal from the decision button 50.

Additionally, with the decision button 50 described above, the key top 52 comes into abutment with only the rubber key 56 in the push direction. With this configuration, in the normal state, the top key 52 comes into abutment with only the upper end of the rubber key 56 and is not placed on the key guide 54. As a result, in the case that sounds are outputted from, for example, the electronic keyboard instrument 1, vibrations associated with the sounds are absorbed by the rubber key 56 having the elastic force. As a result, the generation of resonance in the key top 52 can be prevented or restrained.

While in the buttons 30, 40, 50 which make up the button group SG, the decision button 50 is taken as the example for the description of the present embodiment, the same function and advantage as those of the decision button can also be provided for the other first setting button and second setting button 40.

In addition, the electronic keyboard instrument 1 of the present embodiment includes the decision button 50. As a result, the electronic keyboard instrument 1 can be realized in which the user can push down the decision button while sensing the good clicking feel.

The electronic keyboard instrument 1 includes the LEDs 64 which emit light towards the key top 52. With this configuration, since light from the LEDs 64 is emitted to the outside of the electronic keyboard instrument 1 from the circumference of the key top 52, the dramatic effect of the electronic keyboard instrument 1 can be enhanced.

While the button apparatus is applied to switching on and off the function thereof in the present embodiment, the present embodiment is not limited thereto, and hence, a configuration may be adopted in which the button apparatus also includes a function as, for example, a rotary knob for volume control.

While the electronic keyboard instrument 1 is taken as an example of electronic equipment in the present embodiment, the present embodiment is not limited thereto, and hence, the present embodiment can also be applied to a personal computer, a printer, an electronic calculator, an electronic dictionary, a personal digital assistant (PDA) display device, a wristwatch, household electronic equipment such as a desk-top or table-top clock, and in-office electronic equipment.

The embodiment that has been described heretofore is presented as the example, and hence, there is no intention to limit the scope of the present invention by the embodiment. The novel embodiment can be carried out in other various forms, and various omissions, replacements and modifications can be made thereto without departing from the spirit and scope of the present invention. Those resulting embodiments and modified examples thereof are included in the scope and gist of the present invention and are also included in the scope of inventions claimed for patent under claims below and their equivalents.

What is claimed is:

1. A button apparatus comprising;

a push member on which a push operation can be performed;

an elastic member of a substantially hollowed shape provided on a push direction side of the push member and configured to be elastically deformed on a side thereof which faces the push member in response to the push operation performed on the push member;

a detector configured to detect the push operation performed on the push member;

a moving member supported on the elastic member and configured to move in the push direction in response to the push operation performed on the push member; and a board on which the detector is provided, wherein a side of the elastic member which faces the detector is elastically deformed as a result of the moving member moving in response to the push operation, and wherein the moving member is supported on the elastic member in such a manner as to be spaced apart from a plate surface of the board in a state in which the push operation is not performed on the push member and comprises an abutment portion configured to be brought into abutment with the plate surface of the board in response to the push operation performed on the push member.

2. The button apparatus according to claim 1, wherein the elastic member comprises a first pressing projecting portion configured to press the detector in response to the push operation performed on the push member, and wherein the moving member comprises a second pressing projecting portion configured to press the first pressing projecting portion from an opposite side to the side facing the detector in response to the push operation performed on the push member.

3. The button apparatus according to claim 2, wherein in a state in which the first pressing projecting portion does not press the detector, a thickness of the first pressing projecting portion is larger than a thickness of the second pressing projecting portion, and a width of the first pressing projecting portion is smaller than a width of the second pressing projecting portion.

4. The button apparatus according to claim 3, wherein the first pressing projecting portion is provided on a pushing axis of the elastic member, wherein the second pressing projecting portion is provided on a pushing axis of the moving member, and wherein the pushing axis of the first pressing projecting portion and the pushing axis of the second pressing projecting portion substantially coincide with each other.

5. The button apparatus according to claim 1,
wherein projecting portions are provided on at least three locations on an end portion of the elastic member which faces the push member, the projecting portions are configured to be brought into abutment with the push member at distal end portions thereof, and
wherein at least two of the projecting portions are provided in such a manner as to be arranged across from each other on an axis crossing the pushing axis of the elastic member.

6. The button apparatus according to claim 1,
wherein the elastic member comprises a fixing target portion configured to be fixed to the plate surface of the board, a support portion configured to support the moving member, and a connecting portion configured to be connected between the fixing target portion and the support portion together, and
wherein the support portion moves relative to the fixing target portion in the push direction as a result of the connecting portion being elastically deformed in response to the push operation performed on the push member.

7. The button apparatus according to claim 1,
wherein the push member comprises a push surface on which the push operation is performed, and
wherein the button apparatus comprises a light guide having a surrounding portion surrounding a circumference of the push surface and configured to guide light from a light source towards the surrounding portion.

8. The button apparatus according to claim 7,
wherein the light guide is supported on the elastic member in such a manner as to be permitted to move in at least the push surface.

9. The button apparatus according to claim 7,
wherein the push member comprises a protruding portion protruding to an outside of the push surface and provided on a push direction side of the surrounding portion of the light guide.

10. The button apparatus according to claim 1,
wherein the push member is brought into abutment with only the elastic member in the push direction.

11. An electronic equipment comprising:
the button apparatus according to claim 1; and
an electronic equipment main body configured to be driven by an operation at the button apparatus.

12. The electronic equipment according to claim 11, comprising:
a light source configured to emit light towards the push member.

13. A button apparatus comprising;
a push member on which a push operation can be performed;
an elastic member of a substantially hollowed shape provided on a push direction side of the push member and configured to be elastically deformed on a side thereof which faces the push member in response to the push operation performed on the push member;
a detector configured to detect the push operation performed on the push member; and
a moving member supported on the elastic member and configured to move in the push direction in response to the push operation performed on the push member,
wherein a side of the elastic member which faces the detector is elastically deformed as a result of the moving member moving in response to the push operation,
wherein the push member comprises a push surface on which the push operation is performed,
wherein the button apparatus comprises a light guide having a surrounding portion surrounding a circumference of the push surface and configured to guide light from a light source towards the surrounding portion, and
wherein the push member comprises a protruding portion protruding to an outside of the push surface and provided on a push direction side of the surrounding portion of the light guide.

14. An electronic equipment comprising:
the button apparatus according to claim 13; and
an electronic equipment main body configured to be driven by an operation at the button apparatus.

* * * * *